United States Patent
Yokono et al.

(10) Patent No.: US 9,181,860 B2
(45) Date of Patent: Nov. 10, 2015

(54) CONTROL DEVICE AND CONTROL METHOD FOR INTERNAL COMBUSTION ENGINE

(71) Applicant: Mitsubishi Electric Corporation, Chiyoda-ku, Tokyo (JP)

(72) Inventors: Michihisa Yokono, Kobe (JP); Hideki Hagari, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/250,931

(22) Filed: Apr. 11, 2014

(65) Prior Publication Data

US 2015/0113983 A1    Apr. 30, 2015

(30) Foreign Application Priority Data

Oct. 25, 2013  (JP) .................................. 2013-221903

(51) Int. Cl.
| | |
|---|---|
| F02B 37/18 | (2006.01) |
| F02B 37/16 | (2006.01) |
| F02D 41/00 | (2006.01) |
| F02D 9/02 | (2006.01) |
| F02D 43/00 | (2006.01) |
| F02B 37/22 | (2006.01) |

(52) U.S. Cl.
   CPC ............. *F02B 37/18* (2013.01); *F02B 37/22* (2013.01); *F02D 9/02* (2013.01); *F02D 41/0002* (2013.01)

(58) Field of Classification Search
   None
   See application file for complete search history.

(56) References Cited

U.S. PATENT DOCUMENTS

| | | | |
|---|---|---|---|
| 2013/0282256 A1* | 10/2013 | Watanuki et al. ............. | 701/102 |
| 2014/0137552 A1* | 5/2014 | Yokono et al. ................. | 60/600 |
| 2014/0325982 A1* | 11/2014 | Maruo et al. ................... | 60/602 |

FOREIGN PATENT DOCUMENTS

| | | |
|---|---|---|
| JP | 4237214 B2 | 3/2009 |
| JP | 4583038 B2 | 11/2010 |

* cited by examiner

*Primary Examiner* — Mary A Davis
(74) *Attorney, Agent, or Firm* — Sughrue Mion, PLLC; Richard C. Turner

(57) ABSTRACT

Provided are a control device and a control method for an internal combustion engine, which enable a throttle-valve upstream pressure through simple calculation processing without being affected by a state of an opening degree of a wastegate valve (WGV). When a wastegate (WG) command value to a WGV driving section (212) for driving a WGV (33a) provided in a bypass passage (33) which bypasses a turbocharger (32) is to control supercharging to be weakened to the lowest level, the throttle-valve upstream pressure is estimated from an exhaust-gas amount. Otherwise, a value obtained by adding a preset value to an intake-manifold pressure is used as a throttle-valve upstream pressure estimate value. As a result, the throttle-valve upstream pressure is estimated with high accuracy by an inexpensive configuration without mounting a throttle-valve upstream pressure sensor, and then engine control is performed.

8 Claims, 4 Drawing Sheets

CONTROL DEVICE AND CONTROL METHOD FOR INTERNAL COMBUSTION ENGINE

BACKGROUND OF THE INVENTION

1. Field of the Invention

The present invention relates to a control device and a control method for an internal combustion engine, and more particularly, to a control device and a control method for an internal combustion engine which is, for example, to be mounted in a supercharged engine vehicle.

2. Description of the Related Art

A turbocharger is conventionally used to improve an output of an internal combustion engine (hereinafter referred to simply as "engine"). The turbocharger is a device including a supercharger provided in an intake path of the engine, which rotates a turbine of the supercharger by using an exhaust gas to forcibly feed air to the engine. In the turbocharger, a supercharging pressure is undesirably increased than needed when the engine rotates at a high speed under a high load, which brings about a risk of breaking the engine. Therefore, in general, an exhaust bypass passage is provided upstream of the turbine. In the exhaust bypass passage, a wastegate valve (hereinafter referred to as "WGV") is provided. The WGV causes a part of the exhaust gas flowing through an exhaust path to flow into the exhaust bypass passage to adjust an inflow amount of the exhaust gas to the turbine. In this manner, a pressure (supercharging pressure) in an intake path of the engine is controlled at a proper level.

In general, the WGV is driven by using a positive-pressure actuator. The intake path of the engine (in particular, a portion located upstream of a throttle valve, in which a pressure is increased) and a wastegate actuator (hereinafter referred to as "WGA") are connected to each other. Therefore, when the pressure in the intake path of the engine during a supercharging operation becomes larger than an atmospheric pressure, an operation of the WGA is enabled. By adjusting a relief amount of a relief valve connected to the WGA, a pressure to be supplied to the WGA is adjusted. At the same time, an opening degree of the WGV which cooperates with the WGA is also adjusted. In general, a detector for detecting the amount of actuation is not mounted to the WGA and the WGV. Thus, by using a detected pressure value on a downstream side of a compressor, such as an intake-manifold pressure (hereinafter referred to also as "Pb"), the relief amount of the relief valve is adjusted. In a pressure state before the operation of the WGA is enabled, the WGV which is a bypass valve is retained in a fully-closed state by a mechanical element such as a spring included in the WGA.

The output of the engine is adjusted generally by operating a throttle valve (hereinafter referred to as "THV") provided in the intake path to adjust an opening area of the intake path. By using the opening area of the THV, an upstream pressure and a downstream pressure of the THV with respect to an air flow, and detection values of an upstream temperature and a downstream temperature of the THV, a flow rate of air passing through the THV can be controlled based on a physical calculation formula. The above-mentioned technology using the physical calculation formula is generally employed (for example, see Japanese Patent No. 4237214). However, the technology described above requires a sensor for measuring the upstream pressure of the THV and therefore, has a disadvantage in that the number of components undesirably increases to increase costs.

In view of the above-mentioned problem, a technology for reducing costs is described in Japanese Patent No. 4583038, for example. In the technology described in Japanese Patent No. 4583038, a P2 sensor for detecting a throttle-valve upstream pressure (hereinafter referred to also as "P2") is not used. In Japanese Patent No. 4583038, a gas amount passing through the WGV is calculated based on a detection value of an intake-air flow rate and the WGV opening degree. In this manner, a gas amount supplied to the turbine is calculated based on the gas amount passing through the WGV. Then, the P2 is estimated from the gas amount supplied to the turbine.

As described above, the technology described in Japanese Patent No. 4237214 has a problem in that the costs increase because of the use of the P2 sensor.

With the technology described in Japanese Patent No. 4583038, the opening degree of the WGV is required to be estimated in a system without a detector for detecting the WGV opening degree. Therefore, the technology described in Japanese Patent No. 4583038 has a problem in that the estimate value of the P2 is affected due to estimation accuracy for the opening degree of the WGV. On the other hand, when the positive-pressure WGA is used, a driving force of the WGA fluctuates depending on a state of the P2. Therefore, a complex calculation formula is required to be used to estimate the WGV opening degree by using a control value for the WGA and various types of operation information of the engine.

SUMMARY OF THE INVENTION

The present invention has been made to solve the problems described above, and therefore has an object to provide a control device and a control method for an internal combustion engine, which enable a throttle-valve upstream pressure to be estimated through simple calculation processing without being affected by a state of an opening degree of a wastegate valve.

According to one embodiment of the present invention, there is provided a control device for an internal combustion engine, including: a throttle valve provided in an intake path of the internal combustion engine; a throttle-valve driving section for driving the throttle valve; a supercharger including a turbine provided in an exhaust path of the internal combustion engine and a compressor provided in the intake path so as to be located upstream of the throttle valve, the compressor rotating integrally with the turbine; a wastegate valve provided in a bypass passage which is provided to the exhaust path so as to bypass the turbine; a wastegate-valve driving section for driving the wastegate valve to change a sectional area of a flow path of the bypass passage; a wastegate command-value calculating section for calculating a control command value to the wastegate-valve driving section; an intake-manifold pressure detecting section for detecting a pressure value of an intake manifold provided in the intake path so as to be located downstream of the throttle valve; an intake-air amount detecting section for detecting an intake-air amount of the internal combustion engine; an air/fuel ratio detecting section for detecting an air/fuel ratio of an exhaust gas of the internal combustion engine; an exhaust-gas amount calculating section for calculating an exhaust-gas amount based on the intake-air amount detected by the intake-air amount detecting section and the air/fuel ratio detected by the air/fuel ratio detecting section; and a WG0P2 calculating section for calculating a WG0P2 estimate value which is an estimate value of a throttle-valve upstream pressure in the intake path at a position located downstream of the supercharger and upstream of the throttle valve based on the exhaust-gas amount when assuming that the control command value to the wastegate-valve driving section is 0%, in which when the control command value to the wastegate-valve driving section is 0%, the WG0P2 estimate value calculated by the WG0P2 calculating section is set as a throttle-valve upstream pressure estimate value to calculate a target opening degree of the throttle valve based on the throttle-valve upstream pressure estimate value, the pressure value of the intake manifold, and a target air amount to drive the throttle valve based on the calculated target opening degree.

By the configuration described above, the control device for the internal combustion engine according to the present invention estimates a throttle-valve upstream pressure from the exhaust gas amount when a wastegate-valve control command state is a state in which the supercharging is to be weakened to the lowest level. Therefore, the throttle-valve upstream pressure can be estimated by simple calculation processing without being affected by the state of the opening degree of the waste gate valve.

DETAILED DESCRIPTION OF THE PREFERRED EMBODIMENT

First Embodiment

Figure 1:
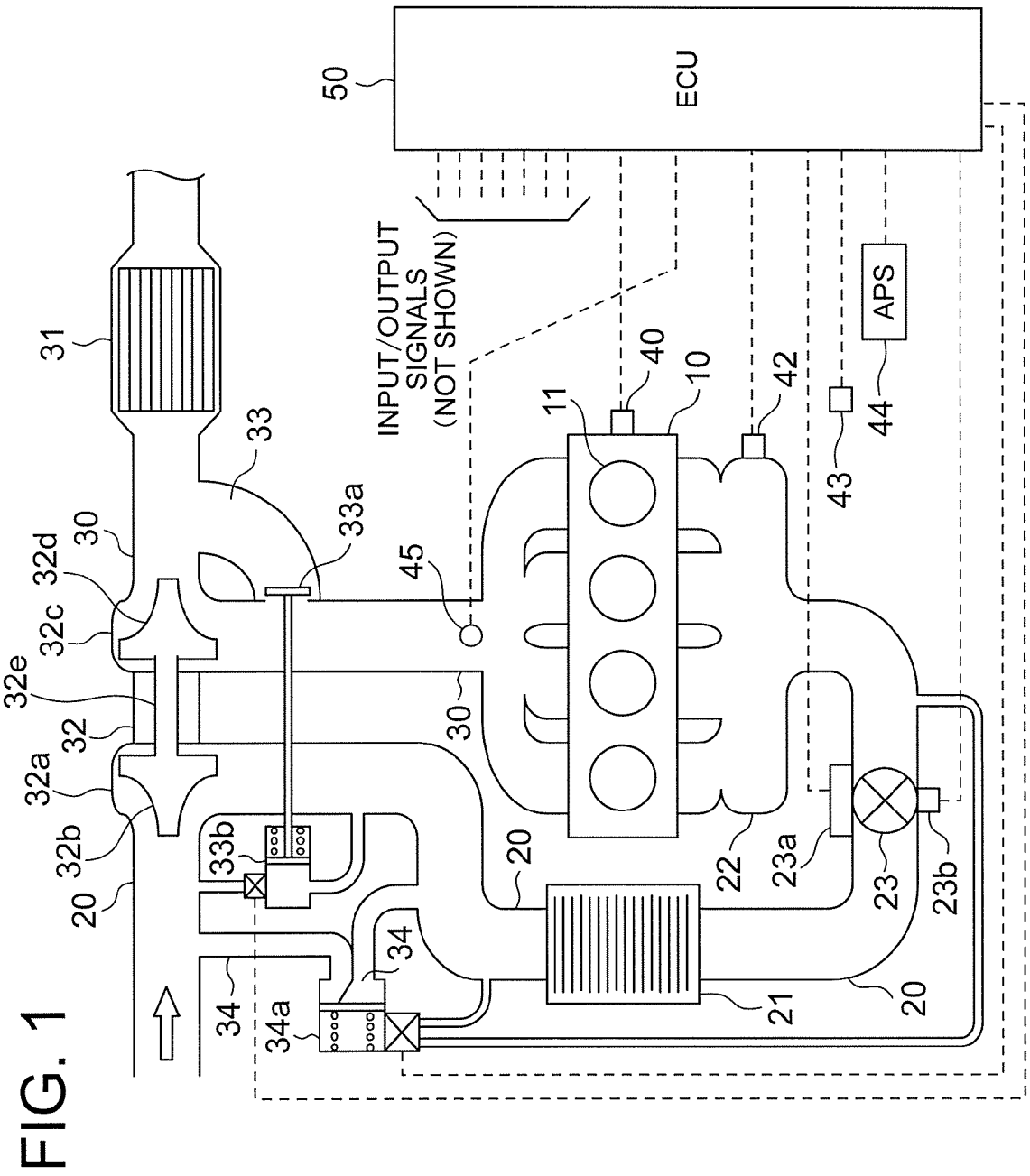
FIG. 1 is a configuration diagram illustrating a configuration of a control device for an internal combustion engine and a periphery thereof according to a first embodiment of the present invention.

Now, a first embodiment of the present invention is described referring to the accompanying drawings. FIG. 1 is a configuration diagram illustrating a configuration of a control device for an internal combustion engine (engine) and a periphery thereof according to the first embodiment.

An internal combustion engine 10 (hereinafter referred to as "engine 10") includes a combustion chamber 11. An intake path 20 is connected to the engine 10 through an intake manifold 22. An exhaust path 30 is also connected to the engine 10. A turbine housing 32c of a turbocharger 32 is provided to the exhaust path 30. A bypass passage 33 is provided between one portion of the exhaust path 30, which is located upstream of the turbine housing 32c, and another portion of the exhaust path 30, which is located downstream of the turbine housing 32c. In the bypass passage 33, a wastegate valve (hereinafter referred to as "WGV") 33a for adjusting a flow-path area of the bypass passage 33 by control of a wastegate actuator (hereinafter referred to as "WGA") 33b is provided. In a portion of the exhaust path 30, which is located downstream of the position at which the bypass passage 33 is connected, a catalyst 31 is provided.

The WGA 33b is a positive-pressure actuator, and a diaphragm is used for the WGA 33b. Therefore, when a pressure in the intake path 20 during a supercharging operation becomes larger than an atmospheric pressure, an operation of the WGV 33a is enabled by the WGA 33b. A relief valve is provided to the WGA 33b. By adjusting a relief amount of the relief valve, a pressure in the diaphragm included in the WGA 33b is adjusted to adjust an opening degree of the WGV 33a which interlocks with the WGA 33b. In general, a detector for detecting the amount of actuation is not mounted to the WGA 33b and the WGV 33a. Therefore, the amount of control of the WGA 33b is adjusted by using a detected pressure value on the downstream side of the turbocharger 32, such as a pressure in the intake manifold 22. In a pressure state before the operation of the WGA 33b is enabled, that is, in a state in which the pressure in the intake path 20 does not exceed the atmospheric pressure, the WGV 33a which is a bypass valve is retained in a fully-closed position by a mechanical element such as a spring included in the WGA 33b.

A compressor housing 32a of the turbocharger 32 is provided to the intake path 20. A bypass passage 34 is provided between one portion of the intake path 20, which is located upstream of the compressor housing 32a, and another portion of the intake path 20, which is located downstream of the compressor housing 32a. An air bypass valve (hereinafter referred to as "ABV") 34a for opening and closing a flow path of the bypass passage 34 is provided in the bypass passage 34. An intercooler 21 is provided in the intake path 20 so as to be located downstream of the compressor housing 32a. A throttle valve (hereinafter referred to as "THV") 23 is provided in the intake path 20 so as to be located downstream of the intercooler 21.

The THV 23 is opened and closed by a throttle motor (motor for driving the throttle valve) 23a. An opening degree of the THV 23 is detected by a throttle-position sensor (hereinafter referred to as "TPS") 23b.

An intake-manifold pressure sensor (hereinafter referred to as "Pb sensor") 42 for detecting an intake-manifold pressure (hereinafter referred to as "Pb") is mounted to the intake manifold 22.

An A/F sensor 45 for detecting an air/fuel ratio corresponding to a ratio of air and a gas which form an exhaust gas is provided in the exhaust path 30.

Outside of the engine 10, an atmospheric-pressure sensor (hereinafter referred to as "P1 sensor") 43 for detecting an atmospheric pressure (hereinafter referred to as "P1") is provided. However, if the P1 can be estimated from a value of the Pb which depends on operating conditions, an estimate value of the P1 may be used as the P1 for the control without providing the P1 sensor 43.

A configuration of the turbocharger 32 (supercharger) is now described. The turbine housing 32c and a turbine wheel 32d provided inside the turbine housing 32c constitute a centrifugal turbine. The compressor housing 32a and a compressor wheel 32b provided inside the compressor housing 32a constitute a centrifugal compressor. The turbine wheel 32d and the compressor wheel 32b are coupled to each other by a turbine shaft 32e so as to be coaxial with each other. With this configuration, when the turbine wheel 32d is rotationally driven by the exhaust gas, the compressor wheel 32b is simultaneously rotationaly driven to supercharge the engine 10 with intake air in the intake path 20. In this manner, the turbocharger 32 includes the centrifugal turbine (32c and 32d) and the centrifugal compressor (32a and 32b).

A diaphragm is used for the ABV 34a. The diaphragm is actuated by a pressure difference between a supercharging pressure and the Pb to form a bypass between the portion of the intake path 20, which is located upstream of the compressor housing 32a, and the portion of the intake path 20, which is located downstream of the compressor housing 32a. In this way, mechanical injury due to an abnormal increase of the supercharging pressure can be prevented. A selector valve is provided to the ABV 34a. The selector valve can switch the Pb supplied to the ABV 34a to the supercharging pressure. By controlling the selector valve, an actuation timing of the ABV 34a is controlled. In a pressure state before the operation of the ABV 34a is enabled, that is, in a state in which the pressure difference supplied to the diaphragm is small, the ABV 34a which is a bypass valve is retained in a fully-closed position by a mechanical element such as a spring included in the ABV 34a.

An electronic control unit (hereinafter referred to as "ECU") 50 is provided to the engine 10. Output signals from various sensors are input to the ECU 50. The various sensors include an Ne sensor 40 for detecting a crank rotation speed (hereinafter referred to as "Ne"), an accelerator-position sensor (hereinafter referred to as "APS") 44 for detecting the amount of pedaling performed by a driver on an accelerator pedal, a water-temperature sensor (not shown) for detecting a temperature of cooling water for the engine 10, an intake-air temperature sensor (not shown) for detecting an intake-air temperature, and a vehicle-speed sensor (not shown) for detecting a vehicle speed. The throttle motor 23a and the actuators such as the WGA 33b are controlled by the ECU 50.

The ECU 50 includes a microcomputer including a CPU, a ROM, and a RAM as a main body. By executing various control programs stored in the ROM, the ECU 50 performs various types of control over the engine 10 in accordance with an operating state of the engine 10. Specifically, various sensor signals from the various sensors described above are input to the ECU 50. Based on the various sensor signals which are input as needed, a fuel injection amount and an ignition timing are calculated to drive a fuel injection device and an ignition device.

Moreover, the ECU 50 calculates an engine output requested by the driver based on the various sensor signals so as to calculate a target THV opening degree. Based on the target THV opening degree, the throttle motor 23a is driven. In this manner, the opening degree of the THV 23 is adjusted by using the sensor signal of the TPS 23b. Further, in parallel to the THV opening-degree control, the ECU 50 also controls the opening degree of the WGV 33a. Specifically, the ECU 50 outputs a control signal to the WGA 33b so that the opening degree of the WGV 33a becomes equal to an opening degree requested each time. In this manner, the ECU 50 controls the opening degree of the WGV 33a. By the THV opening-degree control and the WGV opening-degree control performed by the ECU 50 as described above, the engine output requested by the driver is realized.

For example, the relief valve mounted to the WGA 33b is formed with a solenoid. During a driving time period of the solenoid, the supercharging pressure supplied to the WGA 33b is relieved. Duty driving of the solenoid is performed based on command signals output from the ECU 50 at constant intervals. In the case of a command signal for a duty ratio of 0%, the relief amount becomes the smallest. By the supercharging pressure supplied to the diaphragm of the WGA 33b, the WGV 33a is driven by a large amount. Thus, the amount of exhaust gas which bypasses the turbine becomes larger. As a result, the amount of exhaust gas supplied to the turbine becomes smaller, and hence the operating state in which the supercharging is weakened to the lowest level is achieved. On the other hand, in the case of a command signal for the duty ratio of 100%, the relief amount becomes the largest. Therefore, the supercharging pressure supplied to the diaphragm of the WGA 33b becomes lower. As a result, the amount of driving of the WGV 33a becomes smaller to result in a smaller amount of exhaust gas which bypasses the turbine. As a result, the amount of exhaust gas supplied to the turbine becomes larger. Thus, the operating state in which the supercharging is intensified to the highest level is achieved.

In order to control the output of the engine 10 with high accuracy, an air amount sucked into the engine 10 is required to be detected or calculated with high accuracy. The following methods are known as common technologies of detecting or calculating the air amount. Specifically, there exist a method of detecting the air amount by mounting an airflow sensor in the intake path 20 (air-amount detection method L) and a method of calculating the air amount from the Ne, the Pb, a predetermined correction value, and other various types of information to the ECU 50 (air-amount detection method D).

As another known common technology, there exists a method of calculating the air amount passing through the THV 23 by using a physical calculation formula (air-amount detection method M) by obtaining an opening area of the THV 23 from the TPS 23b and using the upstream pressure (P2) and the downstream pressure (≈Pb) of the THV 23 and the upstream temperature and the downstream pressure thereof (see the paragraph [0028] of Japanese Patent No. 4237214, for example).

When an acceleration request is issued by the driver, a target air amount is calculated based on the operating state of the engine 10 and the like. Then, the target THV opening degree to realize the air amount is calculated. In this case, however, an inverse calculation of the calculation used in the air-amount detection method M is performed to calculate the target opening area of the THV 23 from the P2 and the Pb.

During a non-transient steady operation, the air amount can be detected by an inexpensive system configuration by using the air-amount detection method D. On the other hand, in order to perform the inverse calculation of the calculation used in the air-amount detection method M for the purpose of improvement of engine output responsiveness during a transient operation, a sensor for measuring the P2 is required to be mounted. Therefore, higher costs are required.

Figure 4:
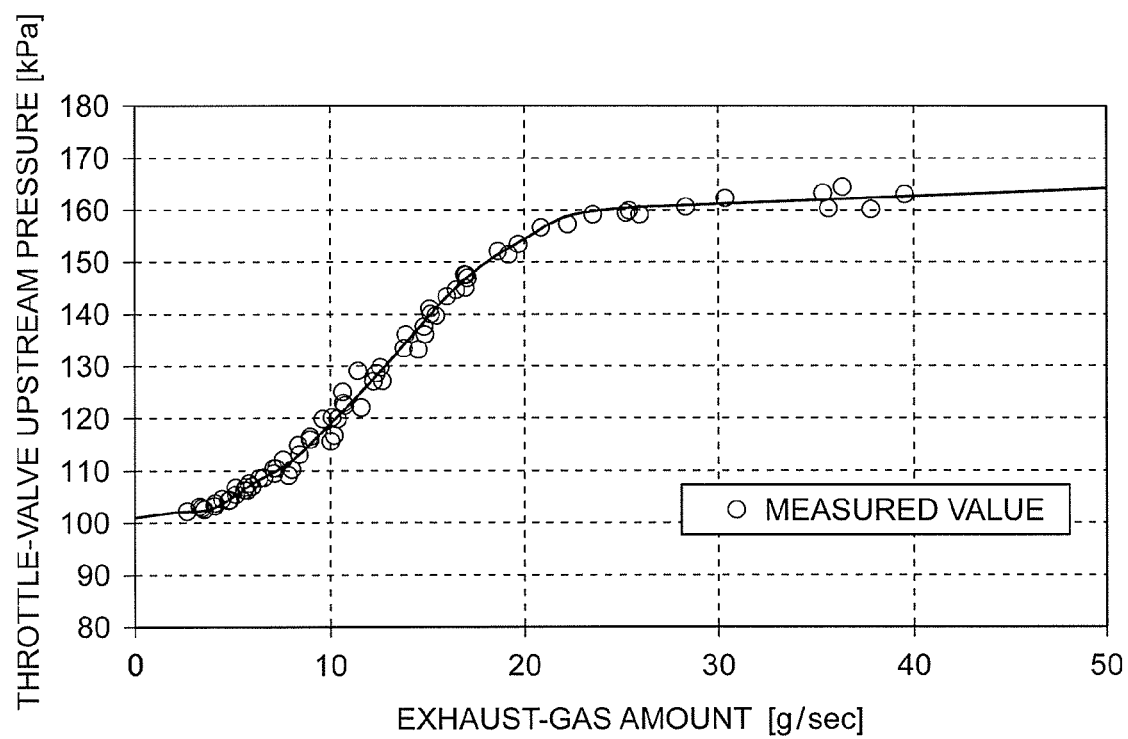
FIG. 4 is a graph showing characteristics of an exhaust-gas amount and a throttle-valve upstream pressure (P2) according to the first embodiment of the present invention.

FIG. 4 shows the result of measurement of the P2 [kPa] with respect to the exhaust gas amount [g/sec] under a plurality of Ne conditions when the command signal to the WGA 33b has the duty ratio of 0%. FIG. 4 shows that, when the command signal to the WGA 33b has the duty ratio of 0%, the P2 can be estimated from the exhaust gas amount even when a P2 sensor is not mounted.

Figure 2:
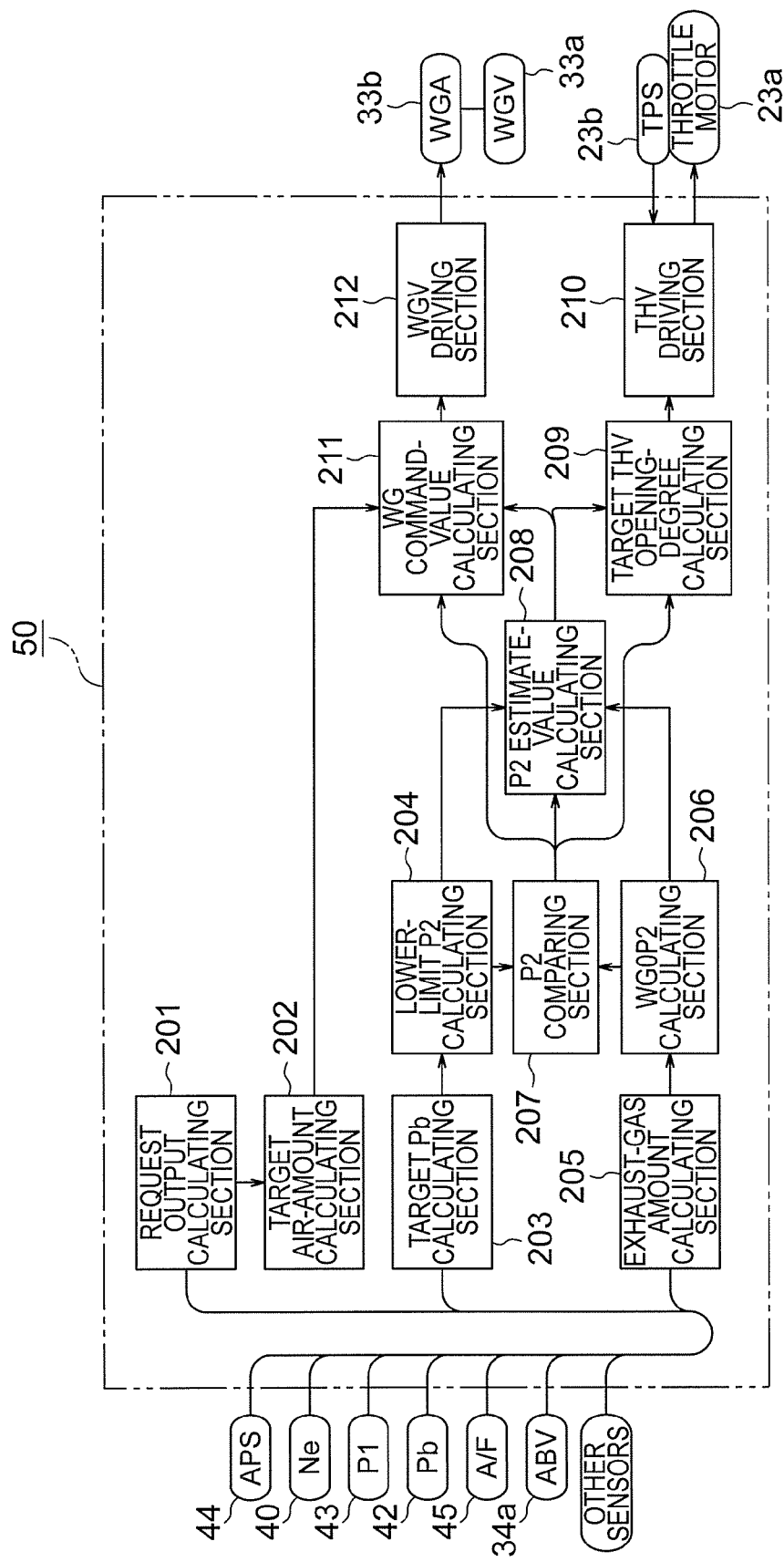
FIG. 2 is a block diagram illustrating a configuration of an ECU included in the control device for the internal combustion engine according to the first embodiment of the present invention.

Next, a configuration of the ECU 50 is described referring to FIG. 2. FIG. 2 is a block diagram illustrating a configuration of the ECU 50 for performing throttle-valve control and wastegate-valve control. The ECU 50 illustrated in FIG. 2 is described, for example, as a system for calculating the intake-air amount into a cylinder by the air-amount detection method D described above.

As illustrated in FIG. 2, the ECU 50 includes a request output calculating section 201, a target air-amount calculating section 202, a target Pb calculating section 203, a lower-limit P2 calculating section 204, an exhaust-gas amount calculating section 205, a WG0P2 calculating section 206, a P2 comparing section 207, a P2 estimate-value calculating section 208, a target THV opening-degree calculating section 209, a THV driving section 210, a WG command-value calculating section 211, and a wastegate-valve driving section (hereinafter referred to as "WGV driving section") 212. The above-mentioned sections are described below.

The request output calculating section 201 calculates an engine output requested by the driver (hereinafter referred to as "request engine output") based on the sensor signals from various sensors including the Ne sensor 40 and the APS 44.

The target air-amount calculating section 202 calculates a target air amount required to realize the request engine output based on the request engine output calculated by the request output calculating section 201 and the operating state of the engine 10.

The target Pb calculating section 203 calculates a target Pb value required to realize the target air amount by using an inverse calculation to the calculation used in the air-amount detecting method D based on the target air amount calculated by the target air-amount calculating section 202 and the operating state of the engine 10.

The lower-limit P2 calculating section 204 adds a predetermined value to the Pb value detected by the Pb sensor 42 to calculate a lower-limit P2 value (lower-limit throttle-valve upstream pressure estimate value). In this case, the above-mentioned predetermined value is a value which is set so as to simulate a pressure drop generated by the passage of air through the THV 23 even when the opening degree of the THV 23 corresponds to an approximately fully-open state. Therefore, the above-mentioned predetermined value may be set to a value obtained by actually measuring a pressure drop state when the THV 23 is in a fully-open state. Moreover, the pressure drop state differs depending on the opening degree of the THV 23 and the operating state of the engine 10. Thus, a table which stores the predetermined value for each opening degree of the THV 23 and each operating state of the engine 10 may be prepared so that the predetermined value is set in accordance with the table. In this case, the P2 value can be more precisely estimated.

The exhaust-gas amount calculating section 205 calculates an intake-air amount into the cylinder by using the above-mentioned air-amount detection method D based on the operating state of the engine 10 to calculate an exhaust-gas amount containing a fuel-amount component based on the intake-air amount and the A/F ratio detected by the A/F sensor 45.

The relationship between the exhaust-gas amount and the P2 is preset in the WG0P2 calculating section 206. The WG0P2 calculating section 206 calculates an estimate value of the P2 (hereinafter referred to as "WG0P2 estimate value") based on the exhaust-gas amount calculated by the exhaust-gas amount calculating section 205. In this case, the WG0P2 estimate value is an estimate value of the P2 at a position downstream of the turbocharger 32 and upstream of the THV 23 when assuming that a control command value (WG command value) to the WGV driving section 212, which is calculated by the WG command-value calculating section 211, is 0%.

The WG0P2 calculating section 206 stores the result obtained by measuring in advance the relationship between the exhaust-gas amount and the WG0P2 estimate value when the WG command value to the WGV driving section 212 is 0%, as a first table. The WG0P2 calculating section 206 determines the WG0P2 estimate value corresponding to the exhaust-gas amount calculated by the exhaust-gas amount calculating section 205 by using the first table.

The WG0P2 calculating section 206 may further store the result obtained by measuring in advance the relationship between the exhaust-gas amount and the WG0P2 estimate value when the ABV 34a is in an open state and it is assumed that the WG command value to the WGV driving section 212 is 0% with, as a second table. In this case, which of the first table and the second table is to be used is determined based on the opened/closed state of the ABV 34a. Specifically, the second table is used when the ABV 34a is in the open state, whereas the first table is used when the ABV 34a is in the closed state.

As described above, in the case of the system in which the ECU 50 controls the driving of the ABV 34a, the set value of the P2 which is selected by switching in accordance with the exhaust-gas amount is calculated as the WG0P2 estimate value in accordance with the operating state of the ABV 34a based on the driving signal from the ECU 50 to the ABV 34a. On the other hand, in the case of the system capable of detecting the operating state of the ABV 34a, the set value of the P2 which is selected by switching in accordance with the exhaust-gas amount is calculated as the WG0P2 estimate value in accordance with the operating state of the ABV 34a based on the detected value of the operating state of the ABV 34a. Filter processing with a primary filter may be further performed on the calculated WG0P2 estimate value. A filter gain used for the primary filter is switched depending on the operating state of the engine 10, specifically, is switched when the engine 10 is performing an acceleration operation or a deceleration operation determined based on a transitional change of the exhaust gas amount with time or when the ABV 34a is performing an opening operation.

The P2 comparing section 207 compares the lower-limit P2 value calculated by the lower-limit P2 calculating section 204 and the WG0P2 value calculated by the WG0P2 calculating section 206.

The P2 estimate-value calculating section 208 determines the P2 estimate value based on the result of comparison calculated by the P2 comparing section 207. Specifically, the P2 estimate-value calculating section 208 determines the P2 estimate value as the P2 estimate value when it is determined that the lower-limit P2 value is larger than the WG0P2 estimate value. Otherwise, the P2 estimate-value calculating section 208 determines the WG0P2 estimate value as the P2 estimate value.

The target THV opening-degree calculating section 209 switches control based on the result of comparison calculated by the P2 comparing section 207. Specifically, when it is determined that the lower-limit P2 value is equal to or smaller than the WG0P2 estimate value as the result of comparison, the target THV opening-degree calculating section 209 calculates the target THV opening degree based on the target air amount, the P2 estimate value, and the Pb value. Specifically, the target THV opening-degree calculating section 209 calculates the opening area of the THV 23, which enables the realization of the target air amount calculated by the target air-amount calculating section 202, as the target THV opening degree by using, for example, the inverse calculation of the calculation used in the air-amount detection method M (see the paragraph [0036] of Japanese Patent No. 4237214, for example). On the other hand, when it is determined that the lower-limit P2 value is larger than the WG0P2 estimate value as a result of comparison, the target THV opening degree is calculated based on the amount of pedaling performed by the driver on the accelerator pedal, which is detected by the APS 44. The target THV opening degree calculated for the detected value by the APS 44 when it is determined that the lower-limit P2 value is larger than the WG0P2 estimate value may be, for example, an opening amount corresponding to the detected value by the APS 44 or may be calculated by using characteristics which are preset by using the Ne detected by the Ne sensor 40, the vehicle speed and the like.

The THV driving section 210 drives the throttle motor 23a by feedback control so that the THV opening degree detected by the TPS 23b becomes equal to the target THV opening degree based on the target THV opening degree calculated by the target THV opening-degree calculating section 209.

The WG command-value calculating section 211 switches the control based on the result of comparison calculated by the P2 comparing section 207. When it is determined that the lower-limit P2 value is equal to or smaller than the WG0P2 estimate value as a result of comparison, the WG command-value calculating section 211 outputs 0% which controls the supercharging to be weakened to the lowest level as the WG command value. On the other hand, when it is determined that the lower-limit P2 value is larger than the WG0P2 value as a result of comparison, the WG command-value calculating section 211 outputs the WG command value which is adjusted to make the Pb value equal to the target Pb value to perform the feedback control.

The WGV driving section 212 drives the WGA 33b based on the WG command value calculated by the WG command-value calculating section 211. As a result, the WGV 33a operates interlockingly with the WGA 33b as described above.

Figure 3:
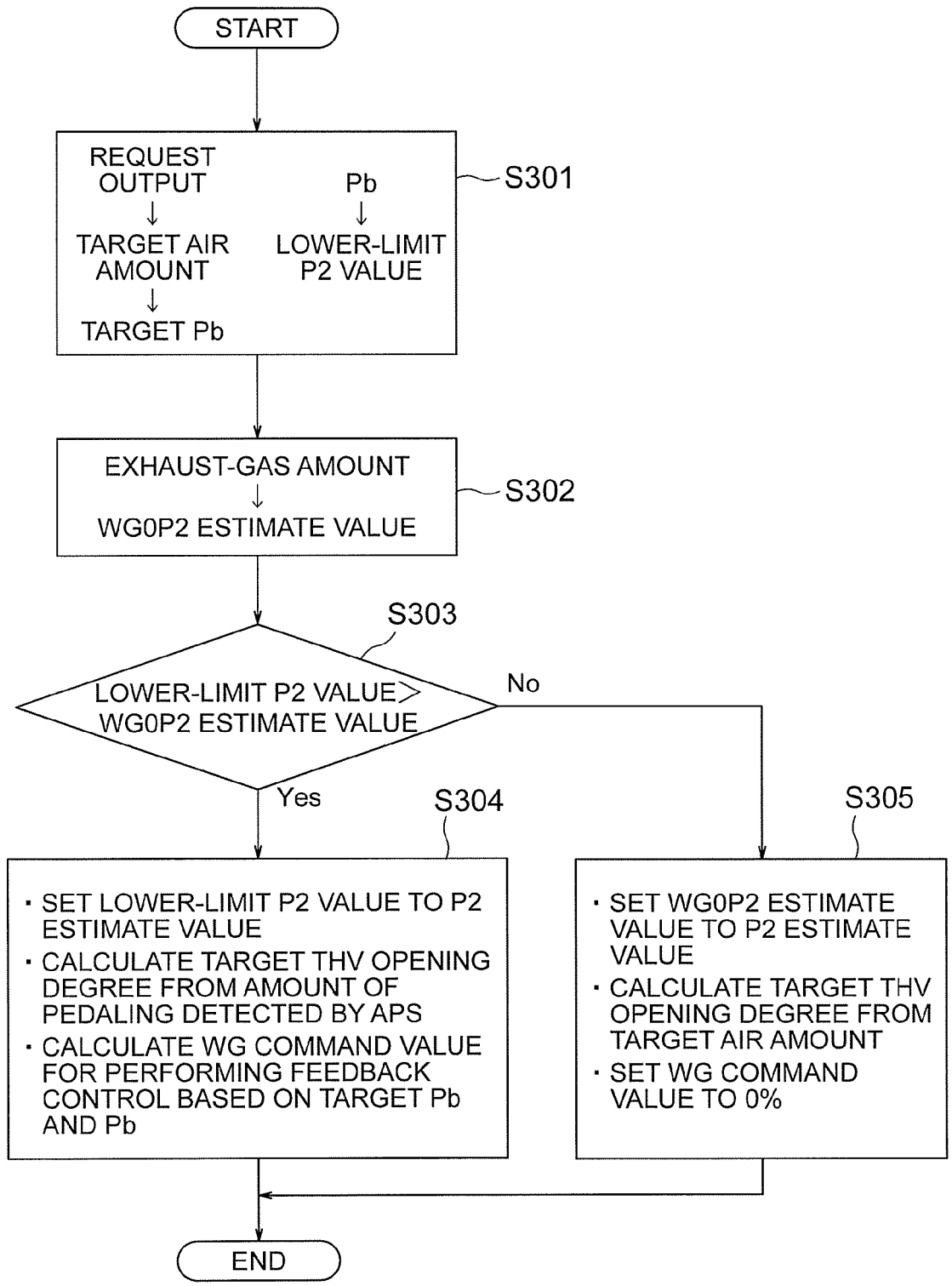
FIG. 3 is a flowchart illustrating an operation of the ECU included in the control device for the internal combustion engine according to the first embodiment of the present invention.

Next, control contents realized by the ECU 50 are described referring to FIG. 3. FIG. 3 is a flowchart illustrating the throttle-valve control processing and the wastegate-valve control processing, which are performed by the ECU 50. The throttle-valve control processing and the wastegate-valve control processing are repeatedly executed at predetermined time intervals.

In Step S301, the processing of the blocks 201, 202, 203, and 204 of the configuration diagram of FIG. 2 is executed. After the processing of the above-mentioned blocks is terminated, the processing proceeds to Step S302. Specifically, in Step S301, the request output calculating section 201 calculates the request output from the driver based on the amount of pedaling performed on the accelerator pedal, which is detected by the APS 44. The target air-amount calculating section 202 calculates the target air amount based on the request output. The target Pb calculating section 203 calculates the target Pb based on the target air amount. Then, the lower-limit P2 calculating section 204 calculates the lower-limit P2 value based on the Pb.

In Step S302, the processing of the blocks 205 and 206 illustrated in the configuration diagram of FIG. 2 is performed. After the processing of the above-mentioned blocks is terminated, the processing proceeds to Step S303. Specifically, in Step S302, the exhaust-gas amount calculating section 205 calculates the exhaust-gas amount based on the operating state of the engine 10. Then, the WG0P2 calculating section 206 calculates the WG0P2 estimate value based on the exhaust-gas amount.

In Step S303, the processing of the block 207 of the configuration diagram of FIG. 2 is performed. Specifically, the P2 comparing section 207 compares the lower-limit P2 value calculated by the lower-limit P2 calculating section 204 and the WG0P2 estimate value calculated by the WG0P2 calculating section 206 with each other. As a result of the comparison, when the lower-limit P2 value is larger than the WG0P2 estimate value, the processing proceeds to Step S304. Otherwise, the processing proceeds to Step S305.

In Step S304, the processing of the blocks 208, 209, and 211 of the configuration diagram of FIG. 2 in the case where the lower-limit P2 value is larger than the WG0P2 estimate value is performed. Specifically, the P2 estimate-value calculating section 208 sets the lower-limit P2 value to the P2 estimate value. Moreover, the target THV opening-degree calculating section 209 calculates the target THV opening degree based on the amount of pedaling performed on the accelerator pedal, which is detected by the APS 44. Further, the WG command-value calculating section 211 calculates the WG command value for making the Pb value equal to the target Pb value to perform the feedback control.

In Step S305, the processing of the blocks 208, 209, and 211 of the configuration diagram of FIG. 2 in the case where the lower-limit P2 value is equal to or smaller than the WG0P2 estimate value is performed. Specifically, the P2 estimate-value calculating section 208 sets the WG0P2 estimate value to the P2 estimate value. Moreover, the target THV opening-degree calculating section 209 calculates the target THV opening degree based on the target air amount, the P2 estimate value, and the Pb value. Further, the WG command-value calculating section 211 sets 0% which controls the supercharging to be weakened to the lowest level as the WG command value.

As described above, the control device for the internal combustion engine according to this embodiment includes the THV (throttle valve) 23 provided in the intake path of the engine (internal combustion engine) 10, the THV driving section 210 for driving the THV 23, the turbocharger (supercharger) 32 including the turbines 32c and 32d provided in the exhaust path 30 of the engine 10, and the compressors 32a and 32b provided in the intake path 20 so as to be located upstream of the THV 23, the compressor 32a rotating integrally with the turbine 32c and the compressor 32b rotating integrally with the turbine 32d, the WGV (wastegate valve) 33a provided in the bypass passage 33 which is provided to the exhaust path 30 so as to bypass the turbine 32c and 32d, the WGV driving section 212 for driving the WGV 33a to change the sectional area of the flow path of the bypass passage 33, the WG command-value calculating section 211 for calculating the WG command value (control command value) to the WGV driving section 212, the Pb pressure detecting section 42 for detecting the pressure (Pb) in the intake manifold 22 which is provided to the intake path 20 so as to be located downstream of the THV 23, the A/F sensor (air/fuel ratio detecting section) 45 for detecting the air/fuel ratio of the exhaust gas of the engine 10, the exhaust-gas amount calculating section 205 including the intake-air amount detecting section for detecting the intake-air amount into the engine 10, which calculates the exhaust-gas amount based on the intake-air amount detected by the intake-air amount detecting section and the air/fuel ratio detected by the A/F sensor 45, and the WG0P2 calculating section for calculating the WG0P2 estimate value based on the exhaust-gas amount, which is the estimate value of the throttle-valve upstream pressure in the intake path 20 on the downstream side of the turbocharger 32 and on the upstream side of the THV 23, when assuming that the WG command value to the WGV driving section 212 is 0%. When the WG command value to the WGV driving section 212 is 0%, the WG0P2 estimate value calculated by the WG0P2 calculating section 206 is set to the throttle-valve upstream pressure estimate value (P2 estimate value), and the target THV opening degree is calculated based on the throttle-valve upstream pressure estimate value (P2 estimate value), the intake manifold pressure (Pb), and the target air amount so that the THV 23 is driven with the calculated THV opening degree.

According to the configuration described above, when the engine 10 is operating in an operation region in which the supercharging with the adjustment of the WGV is not required, the P2 can be estimated with high accuracy without taking the effects of the WGV on the P2 into consideration. As a result, the THV opening degree in accordance with the request torque can be calculated with high accuracy.

In this embodiment, preferably, the WG0P2 calculating section 206 stores the result obtained by measuring in advance the relationship between the exhaust-gas amount and the WG0P2 estimate value when assuming that the WG command value to the WGV driving section 212 is 0%, as the first table. The WG0P2 estimate value corresponding to the exhaust-gas amount calculated by the exhaust-gas amount calculating section 205 is determined by using the first table.

According to the configuration described above, the ECU 50 can calculate the P2 without requiring complex computation processing such as a model calculation.

In this embodiment, more preferably, the control device for the internal combustion engine includes the ABV (air bypass valve) 34a provided in the intake path 20, for opening and closing the bypass passage 34 which bypasses the turbocharger 32. The WG0P2 calculating section stores the result obtained by measuring in advance the relationship between the exhaust-gas amount and the WG0P2 estimate value when the ABV 34a is in the open state and it is assumed that the WG command value to the WGV driving section 212 is 0%, as the second table. The table to be used is determined based on the opened/closed state of the ABV 34a. Specifically, the second table is used when the ABV 34a is in the open state, whereas the first table is used when the ABV 34a is in the closed state.

According to the configuration described above, even when the ABV 34a is controlled to be opened for the purpose of lowering the P2, the P2 can be estimated with high accuracy.

In this embodiment, preferably, the control device for the internal combustion engine further includes the lower-limit P2 calculating section 204 which adds the predetermined value to the Pb (intake-manifold pressure) detected by the Pb sensor (intake-manifold pressure detector) 42 to calculate the lower-limit throttle-valve upstream pressure estimate value (lower-limit P2 value) and the P2 comparing section (throttle-valve upstream pressure comparing section) 207 which compares the WG0P2 estimate value calculated by the WG0P2 calculating section 206 and the lower-limit P2 value with each other. When the lower-limit P2 value is larger than the WG0P2 estimate value as a result of the comparison by the P2 comparing section 207, the lower-limit P2 value is used as the P2 estimate value.

According to the configuration described above, even when the engine 10 operates in the operation region in which the supercharging with the adjustment of the WGV is required, the P2 can be estimated with high accuracy.

In this embodiment, preferably, the control device for the internal combustion engine includes the target Pb calculating section 203 which calculates the target Pb value (target intake-manifold pressure) based on the target air amount. When the lower-limit P2 value is larger than the WG0P2 estimate value as a result of the comparison by the P2 comparing section 207, the WG command-value calculating section adjusts the WG command value to the WGV driving section 212 so that the Pb becomes equal to the target Pb.

According to the configuration described above, even when the engine 10 operates in the operation region in which the supercharging with the adjustment of the WGV is required, the supercharging state can be adjusted with high accuracy in accordance with the request torque.

In this embodiment, preferably, the WG0P2 calculating section 206 performs the filter processing using the filter having the predetermined filter constant on the calculated WG0P2 estimate value.

According to the configuration described above, even when an abrupt change of the P2 occurs due to the transient operation or the like, the estimate value in accordance with an actual pressure behavior can be calculated.

In this embodiment, preferably, the control device for the internal combustion engine includes the ABV 34a provided in the intake path 20, for opening and closing the bypass passage 34 which bypasses the compressors 32a and 32b. The WG0P2 calculating section 206 changes the filter constant based on the opened/closed state of the ABV 34a.

According to the configuration described above, even when the ABV 34a is opened during a decelerating transient operation to rapidly lower the P2, the estimate value in accordance with the actual pressure behavior can be calculated.

What is claimed is:
1. An internal combustion engine comprising:
a throttle valve provided in an intake path of the internal combustion engine;
a supercharger comprising a turbine provided in the exhaust path of the internal combustion engine and a compressor provided in the intake path so as to be located upstream of the throttle valve, the compressor rotating integrally with the turbine;
a wastegate valve provided in a bypass passage which is provided to an exhaust path so as to bypass the turbine;
a control device, where the control device comprising of:
a throttle-valve driver configured to drive the throttle valve;
a wastegate-valve driver configured to drive a wastegate valve to move such that a sectional area of a flow path of the bypass passage is changed;
a wastegate command-value calculator configured to calculate a control command value to the wastegate-valve driver;
an intake-manifold pressure detector configured to detect a pressure value of an intake manifold provided in the intake path so as to be located downstream of the throttle valve;
an intake-air amount detector configured to detect an intake-air amount of the internal combustion engine;
an air/fuel ratio detector configured to detect an air/fuel ratio of an exhaust gas of the internal combustion engine;
an exhaust-gas amount calculator configured to calculate an exhaust-gas amount based on the intake-air amount detected by the intake-air amount detector and the air/fuel ratio detected by the air/fuel ratio detector; and
a WG0P2 calculator configured to calculate a WG0P2 estimate value which is an estimate value of a throttle-valve upstream pressure in the intake path at a position located downstream of the supercharger and upstream of the throttle valve based on the exhaust-gas amount when assuming that the control command value to the wastegate-valve driver is 0%;
wherein when the control command value to the wastegate-valve driver is 0% that corresponds to the wastegate valve being in the fully closed position, the WG0P2 estimate value calculated by the a WG0P2 calculator is set as a throttle-valve upstream pressure estimate value;
the target opening degree is calculated based on the throttle valve upstream pressure estimate value, the pressure value of the intake manifold, and a target air amount; and
the throttle valve is moved to the target opening degree calculated by the control device.

2. The control device for an internal combustion engine according to claim 1,
wherein the a WG0P2 calculator stores, as a first table, a result obtained by measuring in advance a relationship between the exhaust-gas amount and the a WG0P2 estimate value when assuming that the control command value to the wastegate-valve driver is 0%, and
wherein the a WG0P2 calculator determines, by using the first table, the WG0P2 estimate value corresponding to the exhaust-gas amount calculated by the exhaust-gas amount calculator.

3. The control device for an internal combustion engine according to claim 2, further comprising an air bypass valve for opening and closing an intake bypass passage provided to the intake path so as to bypass the compressor,
   wherein the a WG0P2 calculator stores, as a second table, a result obtained by measuring in advance a relationship between the exhaust-gas amount and the a WG0P2 estimate value when the air bypass valve is in an open state and it is assumed that the control command value to the waste-valve driver is 0%, and
   wherein the a WG0P2 calculator uses the second table when the air bypass valve is in the open state and uses the first table when the air bypass valve is in a closed state, based on an opened/closed state of the air bypass valve.

4. The control device for an internal combustion engine according to claim 1, further comprising:
   a lower-limit throttle-valve upstream pressure calculator for adding a predetermined value to the pressure value of the intake manifold, which is detected by the intake-manifold pressure detector, to calculate a lower-limit throttle-valve upstream pressure estimate value; and
   a throttle-valve upstream pressure comparer for comparing the WG0P2 estimate value calculated by the a WG0P2 calculator and the lower-limit throttle-valve upstream pressure estimate value with each other,
   wherein when the lower-limit throttle-valve upstream pressure estimate value is larger than the a WG0P2 estimate value as a result of the comparison by the throttle-valve upstream pressure comparer, the lower-limit throttle-valve upstream pressure estimate value is used as the throttle-valve upstream pressure estimate value, and
   wherein when the lower-limit throttle-valve upstream pressure estimate value is equal to or smaller than the a WG0P2 estimate value as a result of the comparison by the throttle-valve upstream pressure comparer, the a WG0P2 estimate value is used as the throttle-valve upstream pressure estimate value.

5. The control device for an internal combustion engine according to claim 4, further comprising a target intake-manifold pressure calculator configured to calculate a target intake-manifold pressure based on the target air amount,
   wherein when the lower-limit throttle-valve upstream pressure estimate value is larger than the a WG0P2 estimate value as a result of the comparison by the throttle-valve upstream pressure comparer, the wastegate command-value calculator adjusts the control commands value to the wastegate-valve driver so that the pressure value of the intake manifold becomes equal to the target intake-manifold pressure.

6. The control device for an internal combustion engine according to claim 1, wherein the a WG0P2 calculator performs filter processing using a filter having a predetermined filter constant on the calculated a WG0P2 estimate value.

7. The control device for an internal combustion engine according to claim 6, further comprising an air bypass valve provided in the intake path, for opening and closing an intake bypass path which bypasses the compressor,
   wherein the a WG0P2 calculator changes the filter constant based on an opened/closed state of the air bypass valve.

8. A control method for an internal combustion engine, comprising:
   calculating a request output from a driver based on an amount the driver depresses an accelerator pedal;
   calculating a target air amount based on the request output;
   calculating a target intake-manifold pressure value based on the target air amount;
   calculating a lower-limit P2 value which is a lower-limit value of a throttle-valve upstream pressure based on an intake manifold pressure;
   calculating an exhaust-gas amount based on an operating state of the internal combustion engine;
   calculating a WG0P2 estimate value which is an estimate value of the throttle-valve upstream pressure in an intake path at a position located downstream of a supercharger and on upstream of a throttle valve based on the exhaust-gas amount when assuming that a control command value to a wastegate-valve driver is 0% that corresponds to a wastegate valve being in the fully closed position, the wastegate-valve driver being operable to move the wastegate valve;
   comparing the lower-limit P2 value and a WG0P2 estimate value with each other;
   setting the lower-limit P2 value as a throttle-valve upstream pressure estimate value when the lower-limit P2 value is larger than the a WG0P2 estimate value, calculating a target throttle-valve opening degree based on the amount the driver depresses the accelerator pedal, and calculating a WG command value for controlling the intake-manifold pressure value to be equal to the target intake-manifold pressure value to perform feedback control; and
   setting the a WG0P2 estimate value as the throttle-valve upstream pressure estimate value when the lower-limit P2 value is equal to or smaller than the a WG0P2 estimate value, calculating the target throttle-valve opening degree based on the throttle-valve upstream pressure estimate value, the target air amount, and the intake-manifold pressure value to set the control command value to the wastegate-valve driver to 0%; and
   moving the throttle valve to the target throttle-valve opening degree.

* * * * *